United States Patent [19]

Charlton

[11] Patent Number: 4,671,807

[45] Date of Patent: Jun. 9, 1987

[54] POLLUTION CONTROL DEVICE

[76] Inventor: Jaehn B. Charlton, P.O. Box 282, Reedville, Va. 22539

[21] Appl. No.: 872,386

[22] Filed: Jun. 5, 1986

[51] Int. Cl.⁴ .................... B01D 50/00; B01D 53/04; B01D 53/14

[52] U.S. Cl. ....................... 55/100; 55/126; 55/228; 55/233; 55/316

[58] Field of Search ............... 55/100, 126, 228, 233, 55/223, 315, 316

[56] References Cited

U.S. PATENT DOCUMENTS

| | | | |
|---|---|---|---|
| 3,327,455 | 6/1967 | Wertheimer | 55/100 |
| 3,706,182 | 12/1972 | Sargent | 55/228 X |
| 3,708,958 | 1/1973 | Duty et al. | 55/228 X |
| 3,712,029 | 1/1973 | Charlton | 55/100 |

Primary Examiner—Charles Hart

Attorney, Agent, or Firm—Lowe, Price, LeBlanc, Becker & Shur

[57] ABSTRACT

A system for removing pollutants from products of combustion is described. The system is installed in a stack and includes a first wet scrubber section followed by a charcoal filter section, and culminating in a dry filter at the stack outlet. Scrubber fluid are collected in a pit beneath the stack and pump to a filter so that the fluid can be reused. A first fan is disposed above the inlet and below the wet scrubber for directing products of combustion upwardly, and a second fan is disposed between the wet scrubber and the charcoal filter for directing the scrubbed products upwardly. A hood is disposed across the outlet and preferably an electromagnet and electrical grid extend across the outlet. Furthermore, magnetic bars may be disposed in the wet scrubber section to facilitate removal of magnetic particles from the products of combustion.

11 Claims, 9 Drawing Figures

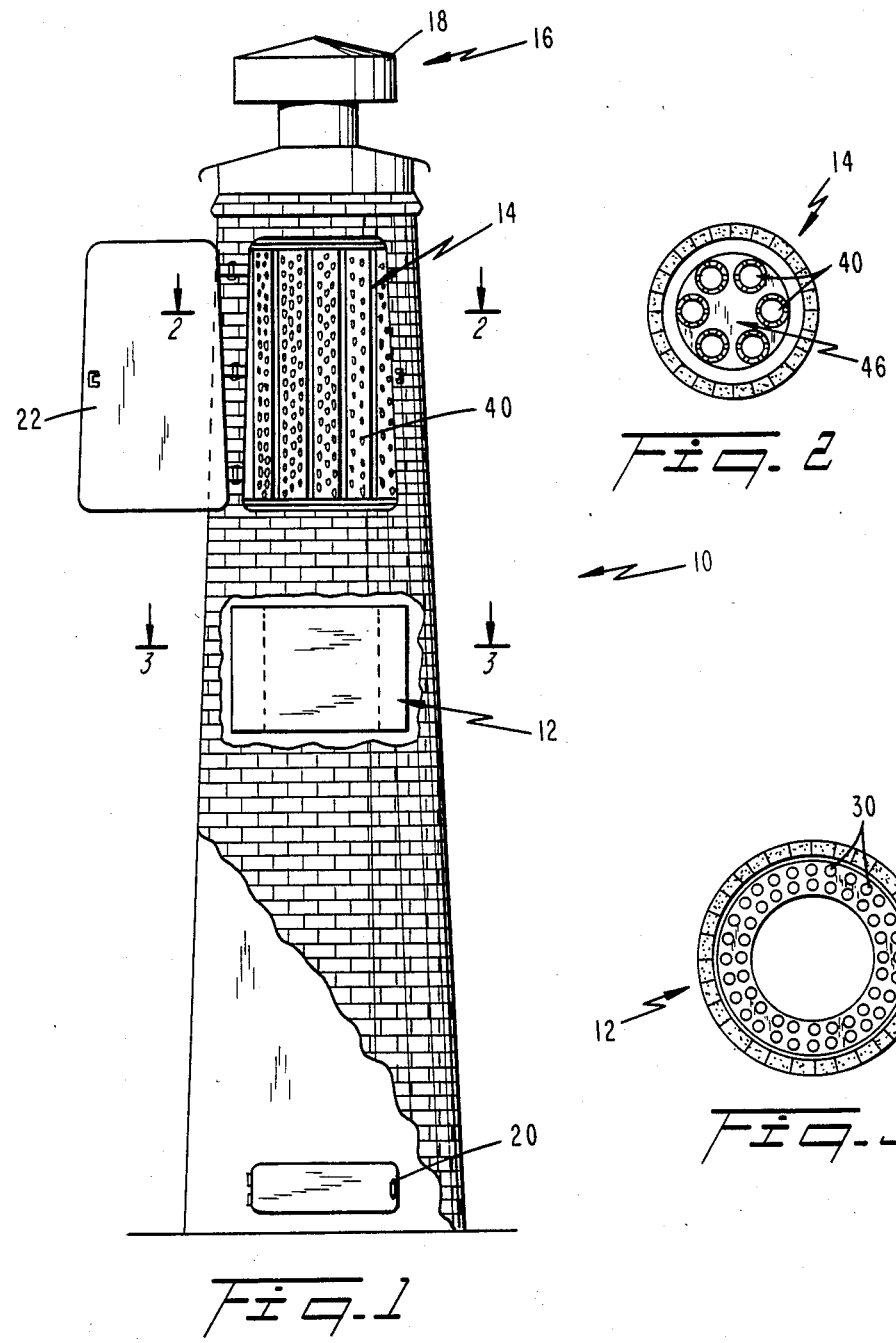

POLLUTION CONTROL DEVICE

This invention relates to a system for removing a wide variety of particulate and gaseous pollutants from the products of combustion before release into the atmosphere.

The problem of acid rain has become increasingly more important as utilities and other industrial users switch from alternate energy sources to high sulfur coal as primary fuel. As is well known, the most abundant energy source in the United States is coal, but most of that coal is high in sulfur. When it is burned in a conventional industrial setting the products of combustion contain sulfur compounds which in the atmosphere can dissolve in water droplets raising the acidity thereof. When rain occurs then the rain does not have the normal neutral pH but rather a slightly acidic pH.

Acid rain can cause enormous environmental problems leading to the death of foliage, trees, wildlife, and fish in the areas affected.

Other types of industrial emissions can also be environmentally damaging. For example, in paper pulping operations, fish treatment facilities and rendering plants, noxious odors can be a major problem. In other industrial settings, particulate matter such as fly ash in emissions can be a problem, too.

In my U.S. Pat. No. 3,712,029, issued Jan. 23, 1973 there is disclosed a multiple stage system for filtering auto exhaust. The system consists of a dry scrubber, a wet scrubber and a dry filter, in series. It has been discovered that the general principles of that invention may equally be applicable in filtering stack gases. The disclosure thereof is hereby incorporated by reference.

Accordingly, an emission treatment system is needed which will treat a wide variety of pollutants and substantially remove the same from products of combustion before they are released into the atmosphere.

It has been discovered that an effecient multiple stage system can achieve the desired results in a stack or chimney. The system of this invention includes a scrubber which uses preferably steam, a charcoal filter, and finally a dry filter. In addition, magnetic rods may be provided for removing magnetic particles from stack gases and an electrical grid may be provided to remove for example soot or carbon particles from the gases. The system then eliminates the need for extremely tall chimneys or stacks and removes virtually all pollutants from a wide variety of industrial emissions before the same are released into the atmosphere.

Accordingly it is an object of this invention to provide a pollution control system which will treat products of combustion to remove a wide variety of different pollutants substantially therefrom before release into the atmosphere.

It is another object of this invention to provide a multiple stage treatment system which may be incorporated in a stack whereby the products of combustion pass upwardly through the different stages which remove different products of combustion therefrom.

It is another object of this invention to provide a pollution control device particularly suited to remove sulfur compounds from stack gases to effeciently eliminate substantially all of said compounds before the products of combustion originally containing said compounds are released into the atmosphere. These and other objects will become readily apparent with reference to the drawings and following description wherein FIG. 1 is a front view of the above ground portion of an embodiment of this invention with the cat-walk removed.

FIG. 2 is a cross-sectional view taken along lines 2—2 of FIG. 1.

FIG. 3 is a cross-sectional view taken along lines 3—3 of FIG. 1.

Figure 6:
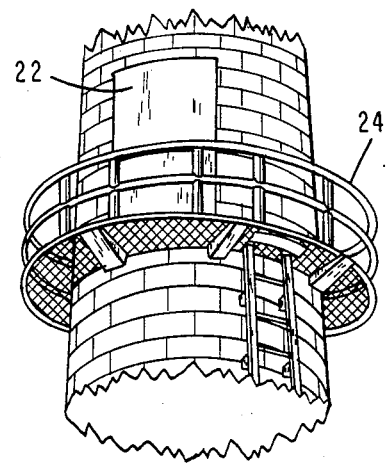
FIG. 6 is a fragmentary view illustrating in perspective a portion of the structure of an embodiment of this invention.

With attention to the drawings the system of this invention may be incorporated within an above ground stack 10 and consists of a first stage scrubber 12, a second stage charcoal filter 14, and a final, dry filter stage 16 contained under a hood 18. An access door 20 may be provided at the base, and a maintenance door 22 is provided adjacent the charcoal filter stage 14 for access thereto for maintenance purposes. Typically a catwalk 24 shown in FIG. 6 and 7 will be provided at access door 22.

Stack 10 will be constructed of conventional materials such as hard glazed brick or the like.

Figure 7:
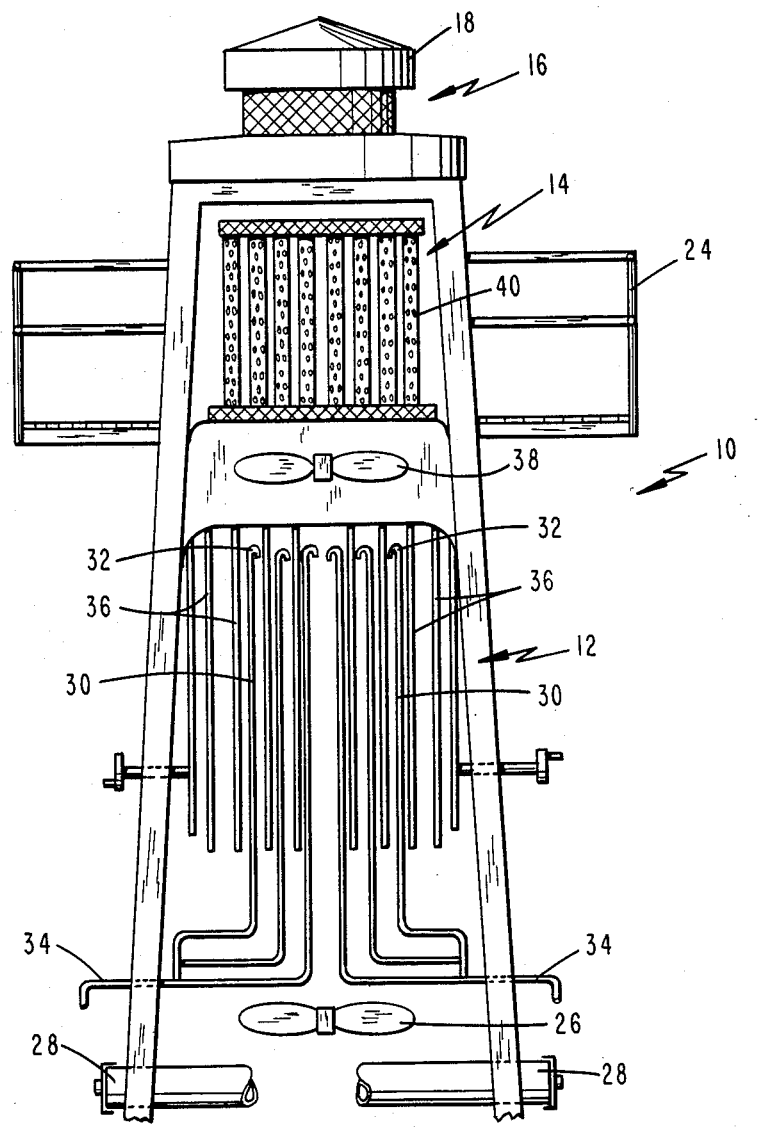
FIG. 7 is a view of an embodiment similar to FIG. 1 with the front portion removed.

With attention to FIG. 7, a reversible lower fan 26 is provided at the base of stack 10 to draw the products of combustion into the stack 10 through suction conduits 28 and direct said products of combustion upwardly into the scrubber section 12.

With attention to FIGS. 3 and 7, scrubber section 12 includes a plurality of upwardly directed conduits 30 each of which terminates in a downwardly directed nozzle 32. Conduits 30 are mutually spaced around the interior of the scrubber section 12. Conduits 30 may be constructed of copper pipe and are intended to be coupled through conduits 34 to a remote source of fluid (not shown) used to treat the upwardly directed products of combustion. Preferably conduits 34 are coupled to a source of steam under pressure but hot water and a degreasing solvent could be used. If the products of combustion contain oily waste hydrocarbons or the like a solvent such a trichloroethylene could be used to remove these materials from the upwardly directed gases. In the alternative, conduits 30 could contain a chemical which would function as a deoderant or any of a wide variety of different fluids which are well known for treating gaseous pollutants. In addition, as will be obvious, if particulate material such as fly ash, dust and the like are contained in the upwardly directed products of combustion the downwardly directed spray of steam or the like will remove a substantial quantity of said products.

In addition, optional magnetic rods 36 as shown in FIG. 7 may be suspended within the interior of scrubber section 12 to attract magnetic particles and remove the same.

A reversible fan 38 is also provided below the intermediate charcoal filter section 14. Both fans 26 and 38 should be heat resistant and reversible. In this way, in the event of fire, the fans can function to aid in fire suppression.

Figure 5:
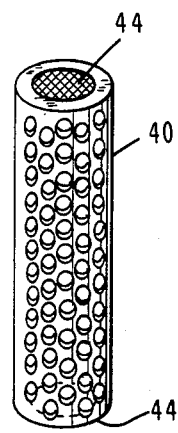
FIG. 5 is a perspective view of a component of the filter system shown in FIG. 2.

With attention to FIGS. 1 and 7, and in particular to FIGS. 2 and 5, the intermediate filter section 14 consists of a plurality of perforated pipes 40 with screening material 42 covering the ends thereof. Pipes 40 are filled with particulate charcoal filter material, activated carbon, or the like. Pipes 40 are disposed between perforated end plates 44 and disposed around the periphery of the interior of stack 10 as shown in FIG. 2 at for example 60 degree intervals. A heat resistent packing material (not shown) fills the space within the interior 46 surrounding pipes 40 and between end plates 44 so that the upwardly directed products of combustion from fan 38 pass upwardly through the individual pipes 40 and the carbon contained therein.

Access door 22 is provided so that from time to time the filter system 14 can be maintained by removal by individual pipes 40 and replacement thereof.

Figure 4:
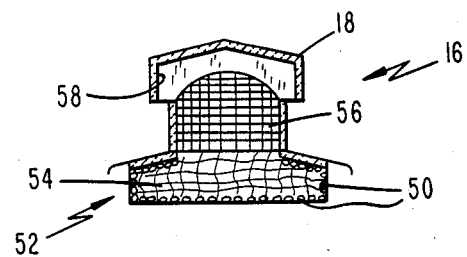
FIG. 4 is a cross-sectional view of the top portion of the device of this invention.

With attention to FIG. 4, the upper final filter portion 16 preferably contains a plurality of electromagnetic rods 50 in the lower portion 52 thereof. Magnetic rods 50 surround a dry filter 54 which may be a pleated material of well known construction such as used in my above identified patent.

In addition, an electric grid 56 is disposed in the upper portion 58 of filters 16 for final removal of soot and the like. Finally, hood 18 is preferably insulated with a layer of coventional insulation 58.

Figure 8:
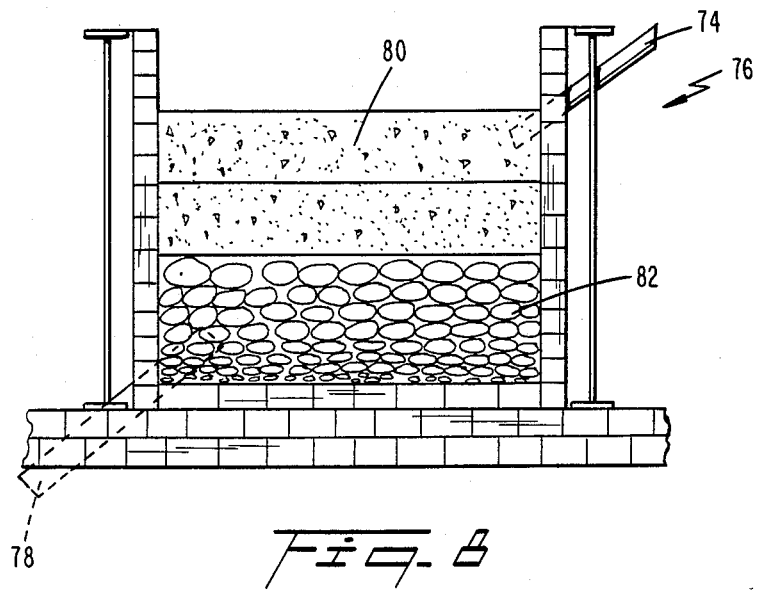
FIG. 8 is a cross-sectional view of the water filter system of this invention.
Figure 9:
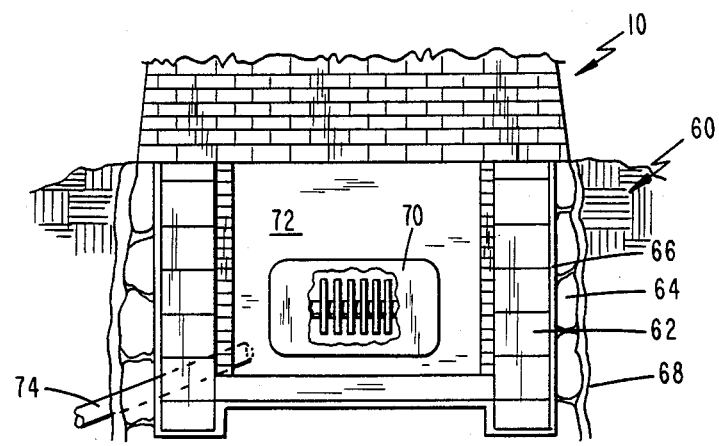
FIG. 9 is a fragmentary cross-sectional view of the below ground portion of the system of this invention.

With attention to FIGS. 8 and 9, stack 10 rests upon a pit 60. Pit 60 preferably is constructed of brick 62 surrounded by a stone strcture 64. An inner liner of plastic 66 is provided and an outer moisture barrier 68 surrounds the stone 64. Pit 60 contains preferably a turbin pump 70 which pumps the water and pollutants 72 through conduit 74 to a water filter 76. A conduit 78 in the base of filter 76 is used to remove the filtered water for recirculation. The upper portion of filter 76 preferably contains sand and gravel layers 80 on top. And aggregate rock layers 82 are provided therebelow.

As the fluid from the scrubber section 12 passes through the downwardly directed ends 32 of conduits 30 it absorbs both heat and soluble pollutants from the upwardly directed products of combustion. The fluid containing pollutants then falls by gravity into pit 60. As the materials circulate through the turbin 70 into conduit 74 particulate materials are comminuted and ultimately the pollutant materials are deposited in filter 76. As will be obvious, from time to time filter 76 will have to be renewed by removal of the layers 80 and 82 and replacement thereof.

In summary then the system of this invention combines a scrubber section, a charcoal filter section, and a dry filter section designed to remove both magnetic and particulate material as well as, depending upon the nature of the products of combustion to be cleaned, gaseous pollutants. As noted above, preferably steam is used in section 12 but a wide variety of well known solvents can be introduced into the upperwardly directed pollutant stream in addition to or instead of steam. If chemical constituents are used, a recovery unit can be inserted between pit 60 and filter 76. For example, an evaporator could be provided to remove an industrial solvent introduced in the scrubber section 12 from a water carrier by conventional procedures if desired.

This invention may be embodied in other specific forms without departing from the spirit or essential characteristics thereto. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A system for removing pollutants from products of combustion before the release thereof into the atmosphere comprising:

an upright stack having an inlet at the base thereof and an outlet at the top and conduit means coupled to said stack inlet for admitting gaseous and entrained particulate products of combustion thereinto;

suction means disposed within said stack for sucking products of combustion thereinto and for conveying the products upwardly from the inlet toward the outlet;

wet scrubber means disposed within said stack above said suction means for directing a scrubber fluid counter currently through the upwardly rising products of combustion;

fan means disposed within said stack above said scrubber means for directing the scrubbed products of combustion upwardly;

charcoal filter means disposed within said stack above said fan means for filtering the scrubbed products of combustion hood means covering the outlet including dry filter means for finally filtering the products from the charcoal filter means before they exit said stack through the outlet.

2. The system of claim 1 wherein said stack further comprises pit means disposed below the inlet and opening upwardly thereinto for receiving the conuntercurrent scrubbing fluid with pollutants entrained therein from the wet scrubber means, and filter means for removing the pollutants therefrom.

3. The system of claim 1 further comprising magentic means disposed in said stack for removing magnetic pollutant particles from the products of combustion.

4. The system of claim 1 wherein said wet scrubber means comprises a plurality of downwardly directed outlets mutually spaced around the interior of said stack.

5. The system of claim 4 further comprising a plurality of magnetic rods mutually spaced around the interior of said stack between said outlets for removing magnetic pollutants from the products of combustion.

6. The system of claim 1 further comprising magnetic means disposed across the outlet of said stack for removing magnetic particles from the products of combustion.

7. The system of claim 6 wherein said magnetic means comprises a plurality of magnetic rods and an electrical grid.

8. The system of claim 1 wherein the scrubber fluid includes steam.

9. The system of claim 2 wherein said pit means further comprises turbine pump means and conduit means coupled thereto for pumping accumulated liquid through said conduit means to a remote filter means.

10. The system of claim 9 wherein said filter means uses a sand and gravel filter media.

11. The system of claim 1 wherein said suction means is a fan disposed above the inlet and below the wet scrubber means.

* * * * *